2,795,601

FLUORINATED 2-ALKENOIC ACIDS, ESTERS AND AMIDES

John L. Rendall, St. Paul, and Wilbur H. Pearlson, White Bear Township, Ramsey County, Minn., assignors to Minnesota Mining & Manufacturing Company, St. Paul, Minn., a corporation of Delaware No Drawing. Application January 3, 1956, Serial No. 556,827

1 Claim. (Cl. 260—486)

The present invention relates to unsaturated fluorinated carbon compounds, and in particular to compounds having the formula $R_fCF=CR'_fCOX$, where X may be —OH, —OR, or —NR$_2$, R representing alkyl radicals or hydrogen.

This application is a continuation-in-part of our co-pending application Serial No. 163,331, filed May 20, 1950, now U. S. Patent 2,730,543.

No one prior to our invention, to our knowledge, has ever made perfluoroacrylic acid or the anhydrides, amides or esters thereof. There has previously been a suggestion of a method for the production of perfluoroacrylonitrile, $CF=CFCN$, but all prior methods suggested for this purpose, which are now employed, have one shortcoming or another, such as lack of economic feasibility, poorness of yield, impractical choice of raw materials, an undue number of steps of process or such like. For example Chaney U. S. Patent No. 2,439,505 may be noted as of general interest in connection with perfluoroacrylonitriles and their production. Also see Chaney U. S. Patent No. 2,456,768, which describes a series of steps of operation which are said to lead to materials which may further be processed by Chaney as described in his first-mentioned Patent No. 2,439,505.

Other methods have heretofore been suggested for making various fluorocarbon compounds which involve direct fluorination, but these operations are difficult to control and involve rather considerable hazards of operation.

Our invention involves a number of advantages over the prior art methods and suggestions known to us.

By starting with an unsaturated fluorocarbon having three or more carbon atoms, and having a terminal carbon atom joined to the adjacent carbon atom by a double bond, $R_fCF_2CR'_f=CF_2$, we can react the same with an alcohol to produce an ether of the formula $$R_fCF_2CR'_fHCF_2OR$$

where R is an alkyl group, e. g., a methyl group. We are able to convert such an ether, by hydrolysis, into the corresponding ester, $R_fCF_2CR'_fHCOOR$. The $R_f$ and $R'_f$ groups are either fluorine or perfluoroalkyl groups, such as $CF_3, C_2F_5$, etc.

The ester just mentioned is a completely novel carbon-fluorine compound, insofar as we are aware, and it has a number of uses. For example, such an ester may be used as a basis for further reactions to produce other carbon-fluorine compounds. For example, it can be treated with ammonia to yield $R_fCF_2CR'_fHCONH_2$, which is a novel amide; or such ester may be reacted with a primary or secondary amine, in lieu of ammonia, to yield the corresponding amides, which are also novel. The unsubstituted amides, i. e., $R_fCF_2CR'_fHCONH_2$, may be dehydrated to yield the corresponding novel nitriles. For example the amide produced by reacting the ester with ammonia may be dehydrated to yield

and this compound, in turn, may be dehydrofluorinated to yield the correspondence alpha beta unsaturated perfluoronitrile, i. e., $R_fCF=CR'_fCN$. In the compound just given, where $R_f$ and $R'_f$ are fluorine, the compound is perfluoroacrylonitrile. The latter compound may be hydrolyzed to yield perfluoroacrylic acid, or where the $R_f$ and $R'_f$ groups are perfluoroalkyl groups instead of fluorine, the hydrolysis step will yield the other corresponding unsaturated perfluoro acids. The unsaturated esters, of the formula $R_fCF=CR'_fCOOR$, may be produced by reacting the corresponding perfluoro unsaturated acid with a compound of the formula ROH, where R is an alkyl group (e. g., with an alcohol), or by direct treatment of the corresponding nitrile with a compound of the formula ROH, as just described above.

Again starting with the ester above mentioned, namely $R_fCF_2CR'_fHCOOR$, we have been able to hydrolyze this compound to yield $R_fCF_2CR'_fHCOOH$, it being understood that R and R' may be either fluorine or a perfluoroalkyl group. This compound is also entirely novel, insofar as we are aware. Among its uses is to employ it as an intermediate from which, by dehydrofluorination, we are able to produce $R_fCF=CR'_fCOOH$. As aforesaid, where the $R_f$ and $R'_f$ are each fluorine, the compound is perfluoroacrylic acid.

Again employing the ester above mentioned, namely $R_fCF_2CR'_fHCOOR$, we have found that by dehydrofluorination of the same we can directly produce esters of unsaturated perfluoro acids, namely, $R_fCF=CR'_fCOOR$.

Employing the $R_fCF_2CR'_fHCONH_2$, above mentioned, we have been able, by direct dehydrofluorination, to produce the unsaturated perfluoroamide. Where the $R_f$ and $R'_f$ are fluorine, the unsaturated perfluoroamide is, specifically, perfluoroacrylamide. The reaction just mentioned, at the same time, also yielded substantial quantities of $R_fCF=CR'_fCN$.

It will be noted that the reactions of our invention, herein described, are concerned to an important extent with the production of alpha beta unsaturated perfluoro acids and their derivatives, for example to the production of perfluoroacrylic acid and its derivatives. Our invention is not concerned with the production of acids where the fluorocarbon group joined to the carboxyl carbon contains a single carbon atom.

The compound $CHClFCOOH$, for example, has been produced in the past (see Young et al, Jol. Amer. Chem. Soc., vol. 71, page 2432, 1949) as by the reaction of trifluorochloroethylene, $CFCl=CF_2$ (which is not a perfluorocarbon compound), with methyl alcohol, to yield the ether $CFClHCF_2OCH_3$. Upon hydrolysis of the compound just mentioned, there is produced

which is an ester of a two-carbon acid and is a saturated compound, from which our type of unsaturated compounds cannot be prepared, insofar as we are aware.

Our process, as already illustrated, leads to perfluoro acids having a double bond between the alpha and beta carbon atoms, and to various derivatives thereof, as already discussed, as well as to novel intermediates above referred to.

We have previously described the use of

as the starting material, for reaction with a compound of the formula ROH, where R is an alkyl group. Instead of reacting the perfluoroolefin with ROH, we have found that we can react it with a dialkyl amine, such as $HNR_2$, where each R is an alkyl group, and thereby produce an amine of the formula

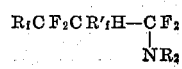

This latter compound can then be hydrolyzed to yield the corresponding amide, which latter can be dehydrofluorinated to yield the corresponding unsaturated amide, e. g.,

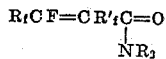

Having already described and illustrated the various steps and reactions contemplated in our invention, we will now further illustrate our invention in connection with the reaction of certain particular reactants in the production of certain definite products. We will take the case where the starting material $R_fCF_2CR'_f=CF_2$ is $CF_3CF=CF_2$, i. e., $C_3F_6$.

Through a solution of 10% potassium hydroxide in methanol was bubbled 1,924 grams of crude $C_3F_6$, the temperature during the reaction being about 30° C. The alcohol solution was poured over crushed ice and the lower layer separated, washed twice with ice water, dried over phosphorus pentoxide and fractionated. A 1200 gram fraction was obtained which boiled at 53.7° C. (743 mm.) with a refractive index: $n_D^{20}=1.2802$. This was identified as the ether $CF_3CFHCF_2OCH_3$.

To hydrolyze the ether, 730 grams was added slowly to 900 grams of 96% sulfuric acid, the temperature being kept below 10° C. by cooling. The temperature was then allowed to warm to room temperature, while the mixture was stirred vigorously. Stirring was continued overnight, by which time the fluorinated phase had dissolved.

The mixture was then poured over 3000 grams of crushed ice, the lower layer separated, washed and distilled. A fraction boiling at 95.0–95.3° C. was indentified as $CF_3CFHCO_2CH_3$. It had a refractive index of $n_D^{20}=1.3198$.

A portion of the ester, 440 grams, was dissolved in 640 cc. of diethylether, and cooled to 0° C. Anhydrous ammonia was bubbled into the stirred solution as fast as the gas could be absorbed. The amide precipitated in the form of white crystals and was recovered in 98% yield. The material was substantially pure $CF_3CFHCONH_2$ melting without further purification at 58–60° C.

Dehydration of the amide $CF_3CFHCONH_2$ was accomplished by the addition of an excess of either $P_2O_5$ or $PCl_5$ and heating until volatile compounds were evolved. The reaction starts at about 50° C. and is normally complete before a temperature of 300° C. is attained. In one experiment, 350 grams of $CF_3CFHCONH_2$ was mixed with 302 grams of $PCl_5$. The mixture was heated for about two hours by which time the reaction appeared to be complete. One hundred and seventy grams of low boiling material was obtained which appeared to be almost entirely $CF_3CFHCN$. Fractionation produced a pure material boiling at 40.5–40.7° C. (775 mm.). The infrared spectrum indicated the presence of both C—H and C≡N groups.

This nitrile can be dehydrofluorinated in good yield to $CF_2=CF-CN$ by passage over agents such as chromia, potassium fluoride, potassium chloride, etc. at 500–800° C. The optimum temperature appears to be in the region of 600° C. when a carbon-lined iron pipe heated by a Hoskins furnace is used as a reactor and a flow rate of about 35 grams per hour is maintained. Under these conditions conversions of 40–50% per pass are obtained, with yields of better than 75%.

The perfluoroacrylonitrile, $CF_2=CF-CN$, boils at 16.4–16.5° C. and has characteristic absorption bands in the infrared at 1800 and 2300 cm.$^{-1}$. Its vapor density and analysis correspond closely to the theoretical values of 107, 33.5% N and 53.3% F.

An example of the preparation of an N,N-disubstituted amide is given by the reaction of diethylamine $(C_2H_5)_2NH$ with $C_3F_6$. Two hundred and three grams of $C_3F_6$ was bubbled through a solution of 73.3 grams of diethylamine in 170 grams of diethyl ether. The temperature was maintained at 30–35° C. The gases which bubbled through were recycled to obtain maximum yield. The resulting solution was filtered and distilled. There was obtained 157 grams of product boiling at 73° C./120 mm. or 128° C./730 mm. and with a refractive index $n_D^{26}$ varying from 1.3490 to 1.3531 and a density at 25° C. of 1.2222, and with strong infrared absorption in the region of 1725—1740 cm.$^{-1}$. This material was identified as a mixture of $CF_3CFHCF_2N(C_2H_5)_2$ and $CF_3CF=CFN(C_2H_5)_2$. The mixture was hydrolyzed in sulfuric acid at room temperature, liberating 1.45 mols of fluoride ion, to form $CF_3CFHCON(C_2H_5)_2$. The saturated amine loses two mols of fluoride ion to form the amide. The unsaturated amine loses one mol of fluoride ion and rearranges to form the saturated amide. The loss of 1.45 mols of fluoride ion indicates that substantially equal proportions of the saturated and unsaturated amines were formed in the original addition reaction. The amide has a boiling point of 106° C./43 mm., refractive index $n_D^{25}=1.3883$, and exhibits strong infrared absorption at 1660 cm.$^{-1}$, which is characteristic of fluorine-containing amides.

The amide $CF_3CFHCON(C_2H_5)_2$ was hydrolyzed in dilute sulfuric acid to form $CF_3CFHCO_2H$.

By a similar method, the addition product of diethylamine and perfluoroisobutene $(CF_3)_2C=CF_2$ was prepared. The compound $(CF_3)_2C=CFN(C_2H_5)_2$ was isolated, boiling at 77–78° C./22 mm., refractive index $n_D^{25}=1.3768$, mol. wt.=249 (theor. 253). The amine was hydrolyzed to form the amide $$(CF_3)_2CHCON(C_2H_5)_2$$

having a melting point of 52–53° C. The product was analyzed for fluorine and nitrogen.

| | F=46.0 | N=5.7 |
|---|---|---|
| Found | | |
| Theoretical | 45.5 | 5.58 |

There was strong infrared absorption at 1665 cm.$^{-1}$, characteristic of fluorine-containing amides. The amide may be hydrolyzed to the acid $(CF_3)_2CHCO_2H$ by the procedure employed for the $CF_3CFHCON(C_2H_5)_2$.

A portion of the saturated ester $CF_3CFHCOOCH_3$ was hydrolyzed in aqueous sodium hydroxide, the solution evaporated to dryness, the residue extracted with acetone, and the acetone evaporated. The residue was added to 100% phosphoric acid and distilled. A fraction boiling at 120–121° with a neutral equivalent of 140 was identified as $CH_3CFHCO_2H$.

In order to produce the corresponding unsaturated perfluoro acid from the compound just named, that is, in order to produce perfluoroacrylic acid therefrom, it is necessary to carry out a controlled dehydrofluorination of such compound. Perfluoroacrylic acid is unstable in aqueous solution, but can be converted to a stable dibromide $CF_2BrCFBrCO_2H$ boiling above 220° C. and having a refractive index $n_D^{20}=1.3320$ and a density $d_4^{20}=1.901$.

The amide, $CF_3CFHCONH_2$, was dehydrofluorinated by passage over pelleted potassium chloride at 600–800° C. The major product isolated was perfluoroacrylamide, $CF_2=CF-CONH_2$, melting at 120.5–121.0° C. The corresponding dibromide $CF_2BrCFBrCONH_2$ melts at 62–62.5° C. Some perfluoroacrylonitrile $CF_2=CFCN$ was simultaneously produced.

The ester, $CF_3CFHCOOCH_3$, when passed over potassium chloride at 600–800° C., produces an unsaturated ester, as shown by the presence of the infrared absorption bands characteristic of C=C and $CO_2R$ and absorption of bromine to yield $CF_2BrCFBrCOOCH_3$, which latter boils at 55°–60° C. at a pressure of 1 mm. of mercury, absolute. The corresponding unsaturated ethyl ester, $CF_2=CFCO_2C_2H_5$, boils at 100° C. and has a refractive index $n_D^{25}=1.3615$. It forms a dibromide with a boiling point of 82-84° C./18 mm. and with a refractive index $n_D^{25}=1.4279$.

The corresponding 1,1-di-H-perfluorobutyl ester, $CF_2=CFCO_2CH_2C_3F_7$, boils at 61.0-61.5° C./50 mm. and has a refractive index $n_D^{25}=1.3190$. It forms a dibromide boiling at 72° C./10 mm. and having a refractive index $n_D^{25}=1.3678$.

A portion of the $CF_3CFHCF_2$—$OCH_3$ was passed over a potassium chloride catalyst at temperatures varying from 600 to 750° C., with best results at about 700° C. Dehydrofluorination occurred as evidenced by the formation of compounds showing the characteristic double-bond absorption in the infrared portion of the spectrum at 1720 cm.$^{-1}$; that is, the compound yielded was $CF_2=CF$—$CF_2OCH_3$.

Our invention may be illustrated still further in the case where $R_fCF_2$—$CR'_f=CF_2$ is $CF_3CF_2CF=CF_2$, i. e., $C_4F_8$.

As in the example presented hereinabove where $C_3F_6$ was the starting material, $CF_3CF_2CF=CF_2$ was bubbled through a solution of 10% potassium hydroxide in methanol to produce the compound $$CF_3CF_2CFHCF_2OCH_3$$

which boiled at, roughly, 75° C.

The compound, $CF_3CF_2CFHCF_2OCH_3$, was hydrolyzed and the product, $CF_3CF_2CFHCOOCH_3$ isolated according to procedures described above. This product was found to boil at, roughly, 118° C.

The amide, $CF_3CF_2CFHCONH_2$, was prepared by treatment of the ester, $CF_3CF_2CFHCOOCH_3$, with ammonia. This amide was dehydrated to the nitrile, $CF_3CF_2CFHCN$, which latter was dehydrofluorinated to the α,B-unsaturated ester $CF_3CF=CFCOOCH_3$ which in turn produced the α,B-unsaturated acid upon hydrolysis.

By our methods, we believe we have been the first ever to produce unsaturated perfluoro acids, e. g., perfluoroacrylic acid and the anhydride, amide and ester derivatives thereof. We also believe that we have a superior method for producing unsaturated nitriles, e. g., perfluoroacrylonitrile. Our methods also lead to the production of a number of other compounds, already referred to, and these reactions proceed quite smoothly and with good yields, and avoid the hazards of direct fluorination processes and also avoid the use of metallic fluorides, e. g., $SbF_5$, commonly employed in the production of polyfluoro compounds.

Our perfluoroacrylic acid and other alpha beta unsaturated perfluoro acids provide an important new starting material for the production of polymers and copolymers. Heretofore perfluoro unsaturated compounds having three or more carbon atoms, available for the production of polymers or copolymers have been very limited and/or have been the result of processes which lack the desired commercial feasibility. Our present invention greatly expands the available unsaturated perfluoro compounds and correspondingly opens up many possibilities in respect to polymers and copolymers. Our invention provides compounds with functional groups heretofore unknown to industry or investigators.

Heretofore $CF_2=CF_2$ has been the only polymerizable perfluoroolefin which has been available commercially. Also the type and character of polymers or copolymers which could be made from this one material have been limited. Our invention involves the production of new and useful perfluoro unsaturated acids and derivatives thereof having three or more carbon atoms. The starting materials for our process, i. e., the $R_fCF_2CR'_f=CF_2$ may be produced as described, for example, in Hals et al. Patent No. 2,668,864. The $R_fCF_2CR'_f=CF_2$ olefins produced according to the method of Hals et al. may employ as a starting material therefor the fluorocarbon acids, or the metallic salts of the fluorocarbon acids described in Diesslin et al. Patent No. 2,567,011.

While our invention has been described in a number of respects, it will be understood that these various specific steps have been given by way of illustration and not by way of limitation. The scope of the invention will be understood from the specification taken as a whole, in connection with the appended claim.

What is claimed is as follows:

As a new product, the chemical compound $$R_fCF=CR'_fCOX$$

where $R_f$ and $R'_f$ are selected from the group consisting of perfluoroalkyl radicals and fluorine, X is selected from the group consisting of —OR and —NR_2 radicals, and each R is selected from the group consisting of alkyl radicals and hydrogen.

No references cited.